US012594526B2

(12) United States Patent
Werner et al.

(10) Patent No.: US 12,594,526 B2
(45) Date of Patent: Apr. 7, 2026

(54) FORWARD OSMOSIS FILTRATION CELL, AND METHODS OF FILTERING WATER WITH A FORWARD OSMOSIS FILTRATION CELL

(71) Applicant: University of Vermont and State Agricultural College, Burlington, VT (US)

(72) Inventors: Logan Werner, Burlington, VT (US); Appala Raju Badireddy, Burlington, VT (US); Richard Grunert, Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 772 days.

(21) Appl. No.: 17/918,948

(22) PCT Filed: Apr. 13, 2021

(86) PCT No.: PCT/US2021/026962
§ 371 (c)(1),
(2) Date: Oct. 14, 2022

(87) PCT Pub. No.: WO2021/211494
PCT Pub. Date: Oct. 21, 2021

(65) Prior Publication Data
US 2023/0233994 A1 Jul. 27, 2023

Related U.S. Application Data

(60) Provisional application No. 63/011,495, filed on Apr. 17, 2020.

(51) Int. Cl.
*B01D 61/00* (2006.01)
*B01D 65/08* (2006.01)
(Continued)

(52) U.S. Cl.
CPC ..... *B01D 61/0022* (2022.08); *B01D 61/0023* (2022.08); *B01D 65/08* (2013.01);
(Continued)

(58) Field of Classification Search
CPC ............ B01D 61/0022; B01D 61/0023; B01D 65/08; B01D 2313/345; B01D 2313/365;
(Continued)

(56) References Cited

U.S. PATENT DOCUMENTS 1,162,213 A 11/1915 Bloom
3,945,926 A 3/1976 Kesting
(Continued)

FOREIGN PATENT DOCUMENTS

AU 2005317945 B2 6/2006
CN 108862490 A 11/2018
(Continued)

OTHER PUBLICATIONS

Fan, et al., "Highly Permeable Thin-Film Composite Forward Osmosis Membrane Based on Carbon Nanotube Hollow Fiber Scaffold with Electrically Enhanced Fouling Resistance," Environ. Sci. & Tech., 52:1444-52 (Year: 2018).*
(Continued)

*Primary Examiner* — Patrick Orme
(74) *Attorney, Agent, or Firm* — Pierce Atwood LLP

(57) ABSTRACT

A forward osmosis filtration cell is provided which includes a fluid passageway and a forward osmosis filtration membrane positioned within the passageway. The filtration membrane divides the fluid passageway into two chambers, a first chamber configured to hold a draw solution, and a second chamber configured to hold a feed solution. The filtration cell further includes a first electrode positioned in the first chamber, and a second electrode positioned in the second chamber. The first and second electrodes are configured to
(Continued)

apply an electric field across the filtration membrane to prevent fouling on the filtration membrane. A method of using a forward osmosis filtration cell in a water treatment system, and a method of retrofitting a water treatment system with first and second electrodes are also provided.

13 Claims, 7 Drawing Sheets

(51) Int. Cl.
| | |
|---|---|
| *C02F 1/44* | (2023.01) |
| *C02F 103/00* | (2006.01) |
| *C02F 103/10* | (2006.01) |
| *C02F 103/20* | (2006.01) |

(52) U.S. Cl.
CPC ........ *C02F 1/445* (2013.01); *B01D 2313/345* (2013.01); *B01D 2313/365* (2013.01); *B01D 2313/54* (2013.01); *B01D 2315/10* (2013.01); *B01D 2321/22* (2013.01); *C02F 2103/001* (2013.01); *C02F 2103/003* (2013.01); *C02F 2103/10* (2013.01); *C02F 2103/20* (2013.01); *C02F 2303/14* (2013.01); *C02F 2303/20* (2013.01)

(58) Field of Classification Search
CPC ............ B01D 2313/54; B01D 2315/10; B01D 2321/22; C02F 1/445; C02F 2103/001; C02F 2103/003; C02F 2103/10; C02F 2103/20; C02F 2303/14; C02F 2303/20
See application file for complete search history.

(56) References Cited

U.S. PATENT DOCUMENTS

| | | | |
|---|---|---|---|
| 5,393,421 A | 2/1995 | Ohe et al. | |
| 5,554,013 A | 9/1996 | Owens et al. | |
| 5,932,185 A * | 8/1999 | Pekala | H01G 11/26 |
| | | | 264/29.1 |
| 8,148,594 B2 | 4/2012 | Denton et al. | |
| 9,140,412 B2 | 9/2015 | Stefanini et al. | |
| 9,248,405 B2 | 2/2016 | McGinnis et al. | |
| 9,901,881 B2 | 2/2018 | Coster et al. | |
| 2006/0144789 A1 * | 7/2006 | Cath | B01D 61/58 |
| | | | 210/259 |
| 2007/0029261 A1 | 2/2007 | Chew | |
| 2009/0065444 A1 | 3/2009 | Alley | |
| 2012/0234694 A1 | 9/2012 | Vecitis et al. | |
| 2012/0273359 A1 | 11/2012 | Suss et al. | |
| 2012/0312687 A1 | 12/2012 | Miller | |
| 2013/0153426 A1 | 6/2013 | Sun et al. | |
| 2014/0106007 A1 * | 4/2014 | Shanahan | A01N 59/00 |
| | | | 424/661 |
| 2015/0075992 A1 | 3/2015 | Cui et al. | |
| 2016/0250404 A1 | 9/2016 | Simonis | |
| 2019/0185351 A1 | 6/2019 | Huang et al. | |
| 2021/0317012 A1 | 10/2021 | Badireddy et al. | |
| 2021/0395117 A1 | 12/2021 | Parthasarathy | |

FOREIGN PATENT DOCUMENTS

| | | | |
|---|---|---|---|
| SE | 501396 C | 6/1995 | |
| WO | 2011063458 A1 | 6/2011 | |
| WO | WO-2018001743 A1 * | 1/2018 | B01D 63/0822 |
| WO | 2020051403 A1 | 3/2020 | |

OTHER PUBLICATIONS

Li, et al., "Membrane fouling mitigation by coupling applied electric field in membrane system: Configuration, mechanism and performance," Electrochimica Acta, 287:124-34 (Year: 2018).*

Akamatsu, et al., "Development of a novel fouling suppression system in membrane bioreactors using an intermittent electric field," Water Research, 44:825-30 (Year: 2010).*
National Minerals Information Center, "Phosphate Rock Statistics and Information" USGS (2021) Accessed Oct. 21, 2024 via Internet Archive: "https://web.archive.org/web/20211226065406/https://www.usgs.gov/centers/national-minerals-information-center/phosphate-rock-statistics-and-information".
Ohlinger, K.N. et al., "Predicting struvite formation in digestion." Water Research 32, 3607-3614 (1998).
Page, S.E. et al., "Terephthalate as a probe for photochemically generated hydroxyl radical." Journal of Environmental Monitoring 12(9), 1658-1665 (2010).
Park, N., et al. "Critical conditions of struvite growth and recovery using MgO in pilot scale crystallization plant." Water Science and Technology 81.12 (2020): 2511-2521.
Pasquini, L.M. et al., "Impact of surface functionalization on bacterial cytotoxicity of single-walled carbon nanotubes." Environmental Science & Technology 46(11), 6297-6305 (2012).
Patel, Jugal K. et al., "Miles of algae covering Lake Erie." New York Times 4 (2017).
Perreault, F., et al. "Antimicrobial properties of graphene oxide nanosheets: Why size matters." ACS Nano 9(7), 7226-7236 (2015).
Piyadasa, C., et al. "Antimicrobial effects of pulsed electromagnetic fields from commercially available water treatment devices—controlled studies under static and flow conditions." Journal of Chemical Technology and Biotechnology 93(3), 871-877 (2018).
Piyadasa, C., et al. "The effect of electromagnetic fields, from two commercially available water treatment devices, on bacterial culturability." Water Science and Technology 73(6), 1371-1377 (2016).
Porcelli, N. et al., "Chemical cleaning of potable water membranes: A review." Separation and Purification Technology 71(2), 137-143 (2010).
Profio, G.D. et al., "Membrane Crystallization Technology." Comprehensive Membrane Science and Engineering. Drioli, E. and Giorno, L., pp. 21-44, Elsevier (2010).
Programme, U.N.D. "Human Development Report 2006: Beyond Scarcity" Power, Poverty and the Global Water Crisis. New York (2006).
Prywer, J. et al. "Struvite Grown in Gel, Its Crystal Structure at 90K and Thermoanalytical Study." Crystal; 2019;9(2);89.
Prywer, J. et al. "Unique surface and internal structure of struvite crystals formed by Proteus mirabilis." Urol. Res. 2012;40(6);699-707.
Rouina, M. et al., "Effect of electromagnetic field on membrane fouling in reverse osmosis process." Desalination 395, 41-45 (2016).
Ruiz-Garcia, A. et al., "80,000h operational experience and performance analysis of a brackish water reverse osmosis desalination plant. Assessment of membrane replacement cost." Desalination 3 7 5, 81-8 8 (2015).
Sablani, S.S. et al., "Concentration polarization in ultrafiltration and reverse osmosis: a critical review." Desalination 141(3), 269-289 (2001).
Saha, S.K. et al., "Determination of the concentrations of oligosaccharides, complex type carbohydrates, and glycoproteins using the phenol sulfuric-acid method." Carbohydrate Research 254, 157-167 (1994).
Saulis, G. et al., Changes of the solution pH due to exposure by high-voltage electric pulses. Bioelectrochemistry 2005, 67 (1), 101-108.
Shannon, M.A. et al., "Science and technology for water purification in the coming decades." Nature 452,301 (2008).
Sharp, R. et al., A theoretical and practical evaluation of struvite control and recovery. Water environment research 2013, 85 (8), 675-686.
Shirazi, S. et al., "Inorganic fouling of pressure-driven membrane processes—A critical review." Desalination 250(1 ), 236-248 (2010).
Song, L.F. et al., "A new normalization method for determination of colloidal fouling potential in membrane processes." Journal of Colloid and Interface Science 271(2), 426-433 (2004).
Sterlitech Corporation "Electric Field-Assisted Cross Flow Cells." https://www.sterlitech.com/electric-field-assisted-cross-flow-cell.html 2 pgs.

(56)     References Cited

OTHER PUBLICATIONS

Tay, KG et al. "A more effective method for fouling characterization in a full-scale reverse Osmosis process." Desalination 177 (2005) 95-107.

Tessaro, L.W.E. et al., "Bacterial growth rates are influenced by cellular characteristics of individual species when immersed in electromagnetic fields." Microbiological Research 172, 26-33 (2015).

Tijing, L.D., et al., "Effect of high-frequency electric fields on calcium carbonate scaling." Desalination 279(1), 47-5 (2011).

Torogomyan, H. et al., "Bactericidal effects of low-intensity extremely high frequency electromagnetic field: an overview with phenomenon, mechanisms, targets and consequences." Critical Reviews in Microbiology 39(1), 102-111 (2013).

Torogomyan, H. et al., "The enhanced effects of antibiotics irradiated of extremely high frequency electromagnetic field on *Escherichia coli* growth properties." Cell Biochemistry and Biophysics 71(1), 419-424 (2015).

Village of Essex Junction, The, et al., "Vermont's Phosphorus Innovation Challenge." https://agriculture.vermont.gov/sites/agriculture/files/documents/Essex%20Jct%20UVM% 20CSWD%20VT% 20Phosphorus%20Innovation%20Challenge%20Proposal.pdf>, pp. 1-8.

Wiesner, M.R. et al., "Peer Reviewed: The promise of membrane technology." Environmental Science & Technology 33(17), 360A-366A (1999).

Xiao, K., et al. "Electronic transport characteristic of an individual CN x/C nanotube Schottky junction." Applied Physics A 83 (2006): 53-56.

Xing, X.K. et al., "Investigation on the electromagnetic anti fouling technology for scale prevention." Chemical Engineering & Technology 28(12), 1540-1545 (2005).

Zhang, P. et al., "Effect of Rotating-Electromagnetic Field on Scaling in Hard Water." pp. 614-617 (2009).

Zhang, R. et al., "Antifouling membranes for sustainable water purification: strategies and mechanisms." Chemical Society Reviews 45(21), 5888-592 (2016).

Zhang, W.X. et al., "A review on flux decline control strategies in pressure-driven membrane processes." Industrial & Engineering Chemistry Research 54(11 ), 2843-2861 (2015).

Zhou, M.J. et al., "A stable nonfluorescent derivative of resorufin for the fluorometric determination of trace hydrogen peroxide: Applications in detecting the activity of phagocyte NADPH oxidase and other oxidases." Analytical Biochemistry 253(2), 162-168 (1997).

Zumbusch et al, "Use of alternating electrical fields as anti-fouling strategy in ultrafiltration of biological suspensions—Introduction of a new experimental procedure for crossflow filtration", Feb. 2, 1998, Journal of Membrane Science, 142, 75-86. (Year: 1998).

U.S. Appl. No. 18/721,969, filed Jun. 20, 2024.

Fan, et al. "Highly permeable thin-film composite forward osmosis membrane based on carbon nanotube hollow fiber scaffold with electrically enhanced fouling resistance." Environmental science & technology 52.3 (Feb. 6, 2018): 1444-1452.

Ibrar et al. "A Review of Fouling Mechanisms, Control Strategies and Real-Time Fouling Monitoring Techniques in Forward Osmosis" Water 2019, 11, 695.

International Search Report and Written Opinion from the International Searching Authority dated Sep. 9, 2021 from corresponding International Patent Application No. PCT/US 21/26962 Filed on Apr. 13, 2021.

Li, et al. "Membrane fouling mitigation by coupling applied electric field in membrane system: Configuration, mechanism and performance." Electrochimica Acta 287 (Oct. 10, 2018): 124-134.

Liu, et al. "An Effective Design of Electrically Conducting Thin-Film Composite (TFC) Membranes for Bio and Organic Fouling Control in Forward Osmosis (FO)" Environ. Sci. Technol. 2016, 50, 10596-10605.

Lu et al. "When Bioelectrochemical Systems Meet Forward Osmosis: Accomplishing Wastewater Treatment and Reuse through Synergy" Water 2015, 7, 38-50.

Motsa, et al. "Organic fouling in forward osmosis membranes: The role of feed solution chemistry and membrane structural properties." Journal of Membrane Science 460 (Jun. 15, 2014): 99-109.

Zhang et al. "Integrating Forward Osmosis into Microbial Fuel Cells for Wastewater Treatment, Water Extraction and Bioelectricity Generation" Environ. Sci. Technol. 2011, 45, 6690-6696.

Abdel-Aal, E. et al., New findings about nucleation and crystal growth of reverse osmosis desalination scales with and without inhibitor. Crystal Growth & Design 2015, 15 (10), 5133-5137.

Alexander, L. F. et al., Application of electric fields for controlling crystallization. CrystEngComm 2019, 21 (34), 5014-5031.

An, R. et al., Solution pH change in non-uniform alternating current electric fields at frequencies above the electrode charging frequency. Biomicrofluidics 2014, 8 (6), 064126.

Anderson, et al., "Precipitation and Dissolution Processes." Water Quality Engineering: Physical and Chemical Treatment Processes. John Wiley & Sons, Inc. pp. 379-434, (2013).

Appiani, E. et al. Aqueous singlet oxygen reaction kinetics of furfuryl alcohol: effect of temperature, pH, and salt content.: Environmental Science-Processes & Impacts 19(4), 507-516 (2017).

Arnal, J.M. et al., "Expanding Issue in Desalination." Ning, R.Y. (ed), pp. 63-84, InTech. (2011).

Badireddy, A.R., et al., "Lipophilic nano-bismuth inhibits bacterial growth, attachment, and biofilm formation." Surface Innovations 1(3), 181-189 (2013).

Badireddy, A.R., et al., "Bacteriophage inactivation by UV—A illuminated fullerenes: Role of nanoparticle-virus association and biological targets." Environ. Sci. Technol. (2012).

Badireddy, A.R., et al., "Bismuth dimercaptopropanol (BisBAL) inhibits the expression of extracellular polysaccharides and proteins by Brevundimonas diminuta: Implications for membrane microfiltration." Biotechnology and Bioengineering 99(3), 634-643 (2008a).

Badireddy, A.R., et al., "Inactivation of bacteriophages via photosensitization of fullerol nanoparticles." Environmental Science and Technology 41, 6627-6632 (2007).

Badireddy, A.R., et al., "Role of extracellular polymeric substances in bioflocculation of activated sludge microorganisms under glucose-controlled conditions." Water Research 44(15), 4505-4516 (2010).

Badireddy, A.R., et al., "Spectroscopic characterization of extracellular polymeric substances from *Escherichia coli* and Serratia marcescens: suppression using su••inhibitory concentrations of bismuth thiols." Biomacromolecules 9, 3079-3089 (2008b).

Bagheri, M. et al., "Critical review of fouling mitigation strategies in membrane bioreactors treating water and wastewater." Bioresource Technology 258, 318-334 (2018).

Benjamin, Mark et al., "Membrane Processes." Water Quality Engineering: Physical/Chemical Treatment Processes, First Edition. Chapter 15, pp. 731-845.

Bhuiyan, M. I. H. et al., Nucleation and growth kinetics of struvite in a fluidized bed reactor. Journal of Crystal Growth 2008, 310 (6), 1187-1194.

Bird, R.B., et al., "Temperature Distributions in Turbulent Flow." Transport Phenomena, John Wiley & Sons, Inc., New York (2002). Chapter 13.

Bowen, W.R., et al., "Dynamic cross flow ultrafiltration of colloids: a deposition probability cake filtration approach." Separation and Purification Technology 24(1-2), 297-308 (2001).

Bowen, W.R., et al., "Dynamic ultrafiltration model for charged colloidal dispersion—A Wigner-Seitz cell approach." Chemical Engineering Science 50(11), 1707-1736 (1995).

Bowen, W.R., et al., "The osmotic pressure of electrostatically stabilized colloidal dispersions." Journal of Colloid and Interface Science 184(1), 241-250 (1996).

Chu, C.H. et al., "Photochemical and nonphotochemical transformations of cysteine with dissolved organic matter." Environmental Science & Technology 50(12), pp. 6363-6373.(2016).

Cogan, N.G. et al., "Optimal backwashing in dead-end bacterial microfiltration with irreversible attachment mediated by extracellular polymeric substances production." Journal of Membrane Science 520, 337-344. (2016).

(56) References Cited

OTHER PUBLICATIONS

Combe, Liv. "How Your Body Uses Phosphorus." Healthline, Healthline Media, Nov. 21, 2014, Accessed Jul. 23, 2024. URL: www.healthline.com/health/how-your-body-uses-phosphorus#phosphorus-in-the-body.

Enevoldsen, A.D. et al., "Electro-ultrafiltration of industrial enzyme solutions." Journal of Membrane Science 299(1-2), 28-37 (2007).

Erdim, E. et al., "Characterizing reactive oxygen generation and bacterial inactivation by a zerovalent iron-fullerene nano-composite device at neutral pH under UV-A illumination." Journal of Hazardous Materials 283 (2015): 80-88.

Fojt, L. et al. "Effect of electromagnetic fields on the denitrification activity of Paracoccus denitrificans." Bioelectrochemistry 70(1 ), 91-95 (2007).

Formoso, P. et al., "Electro•conductive membranes for permeation enhancement and fouling mitigation: A short review." Membranes 7(3), 24 (2017).

Gabrielyan, L. et al., "Biohydrogen production by purple non-sulfur bacteria Rhodobacter sphaeroides: Effect of low-intensity electromagnetic irradiation." Journal of Photochemistry and Photo biology B: Biology 162, 592-596 (2016).

Gad, A. et al., "Effect of electric pulse parameters on releasing metallic particles from stainless steel electrodes during PEF processing of milk." Ieee Transactions on Industry Applications 50(2), 1402-1409 (2014).

Gao, W. et al., "Membrane fouling control in ultrafiltration technology for drinking water production: A review." Desalination 272(1), 1-8 (2011).

Heraldy, E. et al., In Application of quantitative XRD on the precipitation of struvite from Brine Water, IOP Conference Series: Materials Science and Engineering, IOP Publishing: 2017; p. 012015.

Hoek, E.M.V. et al., "Modeling the effects of fouling on full-scale reverse osmosis processes." Journal of Membrane Science 314(1 ), 33-49 (2008).

Huotari, H.M. et al., "Cross flow Membrane Filtration Enhanced by an External DC Electric Field: A Review." Chemical Engineering Research and Design 77(5), 461-468 (1999).

Hydroflow USA, "How Hydropath Technology Works." https://www.hydroflow-usa.com/Technology, 5 pgs (2018).

Hydroflow USA, "Improve Water Filtration & Purification." https://hydroflow-usa.com/Filtration (2018).

Janssen, E.M.L. et al., "Aquatic photochemical kinetics of benzotriazole and structurally related compounds." Environmental Science—Processes & Impacts 17(5), 939-946 (2015).

Jianguo, W. et al., "Effects of Alternating Electromagnetic Field on Calcium Carbonate Scaling Process." Jiang, L. ( ed), pp. 527-534, Springer Berlin Heidelberg, Berlin, Heidelberg. (2012).

Jonsson, G., et al. "Fundamentals in Reverse Osmosis." Comprehensive Membrane Science and Engineering, pp. 1-22, Elsevier, New York (2010).

Kang, S., et al., "Antibacterial effects of carbon nanotubes: Size does matter." Langmuir 24(13), 6409-6413 (2008).

Kim, H.J. et al., "High-performance reverse osmosis CNT/polyamide nanocomposite membrane by controlled interfacial interactions." ACS Applied Materials & Interfaces 6(4), 2819-2829 (2014).

Le Corre, K. S. et al., Phosphorus recovery from wastewater by struvite crystallization: A review. Critical Reviews in Environmental Science and Technology 2009, 39 (6), 433-477.

Le Corree, K.S. et al., "Struvite crystallisation and recovery using a stainless steel structure as a seed material." Water Res; 2007; 41; 2449-2456.

Li, J. et al. "Quantitative study of the effect of electromagnetic field on scale deposition on nanofiltration membranes via UTDR." Water Research 41(20), 4595-4610 (2007).

Li, M.F. et al., "Ultrafiltration membranes functionalized with lipophilic bismuth dimercaptopropanol nanoparticles: Ant••fouling behavior and mechanisms." Chemical Engineering Journal 313, 293-300 (2017).

Lin, J.C. et al. "Membrane fouling mitigation: Membrane cleaning." Separation Science and Technology 45(7), 858-872 (2010).

Lutz, H. "Ultrafiltration: Fundamentals and Engineering." Comprehensive Membrane Science and Engineering. Drioli, E. and Giorno, L. (eds), pp. 115-140, Elsevier, New York (2010).

Martell, A. et al., "Critically selected stability constants of metal complexes." NIST Standard Reference Database 46, Texas A&M University (1998).

Masliyah, J.H. et al., "Electrokinetic and Colloid Transport Phenomena." John Wiley & Sons, Inc., Hoboken, New Jersey (2006).

Meneses, N. et al., pH-changes during pulsed electric field treatments—Numerical simulation and in situ impact on polyphenoloxidase inactivation. Innovative Food Science & Emerging Technologies 2011, 12 (4), 499-504.

Morel, F.M.M. Table 6.1 p. 244, Wiley, New York (1983).

Pan, Z. et al. "Membrane technology coupled with electrochemical advanced oxidation processes for organic wastewater treatment: Recent advances and future prospects." Chemical Engineering Journal 376 (2019): 120909, 19 pages.

Shen, Y., et al. "A critical review on electric field-assisted membrane processes: implications for fouling control, water recovery, and future prospects." Membranes 11.11 (2021): 820, 36 pages.

* cited by examiner

FORWARD OSMOSIS FILTRATION CELL, AND METHODS OF FILTERING WATER WITH A FORWARD OSMOSIS FILTRATION CELL

RELATED APPLICATIONS

This application claims priority under 35 U.S.C. § 371 to international application number PCT/US2021/026962, filed on Apr. 13, 2021, and claims the benefit under 35 U.S.C. § 119(e) to U.S. Provisional Application No. 63/011, 495 filed on Apr. 17, 2020, the contents of which is incorporated by reference herein in its entirety.

FIELD OF THE INVENTION

The invention relates, in part, to a forward osmosis filtration cell and methods of filtering water with the forward osmosis filtration cell.

BACKGROUND

In a filtration system, such as a water treatment system, it may be desirable to remove one or more compositions from the water stream, which may be considered contaminants in the water stream.

Forward Osmosis is an emerging technique in water filtration and wastewater recovery. Forward Osmosis (FO) is a separation technique that relies on a chemical concentration gradient to separate solutions. In Forward Osmosis, two solutions are separated by a semi-permeable membrane barrier. Forward osmosis membranes are typically designed to be more or less exclusively selective towards water molecules, which enables them to separate water from all other contaminants. In forward osmosis membrane filtration system, the driving force for water separation is quantified by the osmotic pressure difference between solutions on either side of the forward osmosis membrane. The higher the osmotic pressure difference, the higher the rate of water diffusion.

SUMMARY OF THE INVENTION

In one embodiment, a forward osmosis filtration cell is provided. The filtration cell includes a fluid passageway, and a forward osmosis filtration membrane positioned within the passageway. The filtration membrane divides the fluid passageway into two chambers: a first chamber configured to hold a draw solution, and a second chamber configured to hold a feed solution. The filtration cell also includes a first electrode positioned in the first chamber, and a second electrode positioned in the second chamber. The first electrode and the second electrode are configured to apply an electric field across the filtration membrane to prevent fouling on the filtration membrane.

In another embodiment, a method of using a forward osmosis filtration cell to filter water in a water treatment system is provided. The method incudes providing a forward osmosis filtration membrane in a fluid passageway, the filtration membrane dividing the fluid passageway into a first chamber and a second chamber. The method also includes flowing a draw solution into the first chamber, flowing a feed solution into the second chamber, and generating an electric field across the filtration membrane with a first electrode positioned in the first chamber and a second electrode positioned in the second chamber to prevent fouling on the membrane.

In yet another embodiment, a method of retrofitting a water treatment system to filter water is provided where the water treatment system has a forward osmosis filtration membrane in a fluid passageway, the filtration membrane dividing the fluid passageway into a first chamber and a second chamber. The method includes placing a first electrode in the first chamber, placing a second electrode in the second chamber, and generating an electric field across the filtration membrane with a first electrode positioned in the first chamber and a second electrode positioned in the second chamber to prevent fouling on the membrane.

DETAILED DESCRIPTION

Aspects of the present disclosure are directed to a forward osmosis filtration cell and methods of use. The filtration cell may be used in a filtration or separation system, such as a water treatment system, and it may be configured to remove one or more compositions (i.e. particles or contaminants). It is contemplated that the forward osmosis filtration cell is configured to remove compositions, such as, but not limited to dissolved salts, organic molecules, alginate, bacteria, viruses, colloidal particles, and any other charged species within a water treatment system. As set forth in more detail below, the cell may also have functions in the concentration or dilution of solutions in applications such as seawater desalination or concentration of agricultural fertilizer.

As mentioned above, Forward Osmosis (FO) is a separation technique that relies on a chemical concentration gradient in order to separate solutions. In Forward Osmosis, two solutions are separated by a semi-permeable membrane barrier. In this process, the difference in concentration between the two solutions, separated by a semi-permeable membrane barrier, drives water, the solvent, from a low concentration of solute to a high concentration of solute.

Although Forward Osmosis can be effective for the recovery of water from various sources, it can be hindered by the occurrence of fouling, i.e. blockage on the membrane surface. Foulants can be removed from the membrane surface, however many techniques include costly chemical cleaning and/or energy intensive manual cleaning. Both of these methods also require downtime of the water treatment system, and repeated chemical cleaning processes can damage the membrane.

As set forth in more detail below, aspects of the present disclosure are directed to a forward osmosis filtration cell which incorporates techniques to mitigate fouling on the membrane. This may prolong the useable life of the forward osmosis membrane for water and wastewater reuse. In particular, one approach to preventing membrane fouling is to apply an electric field within the filtration cell. Experiments have shown that an electric field may act as a force on the foulants, causing the foulants to migrate away from the membrane surface.

Figure 1:
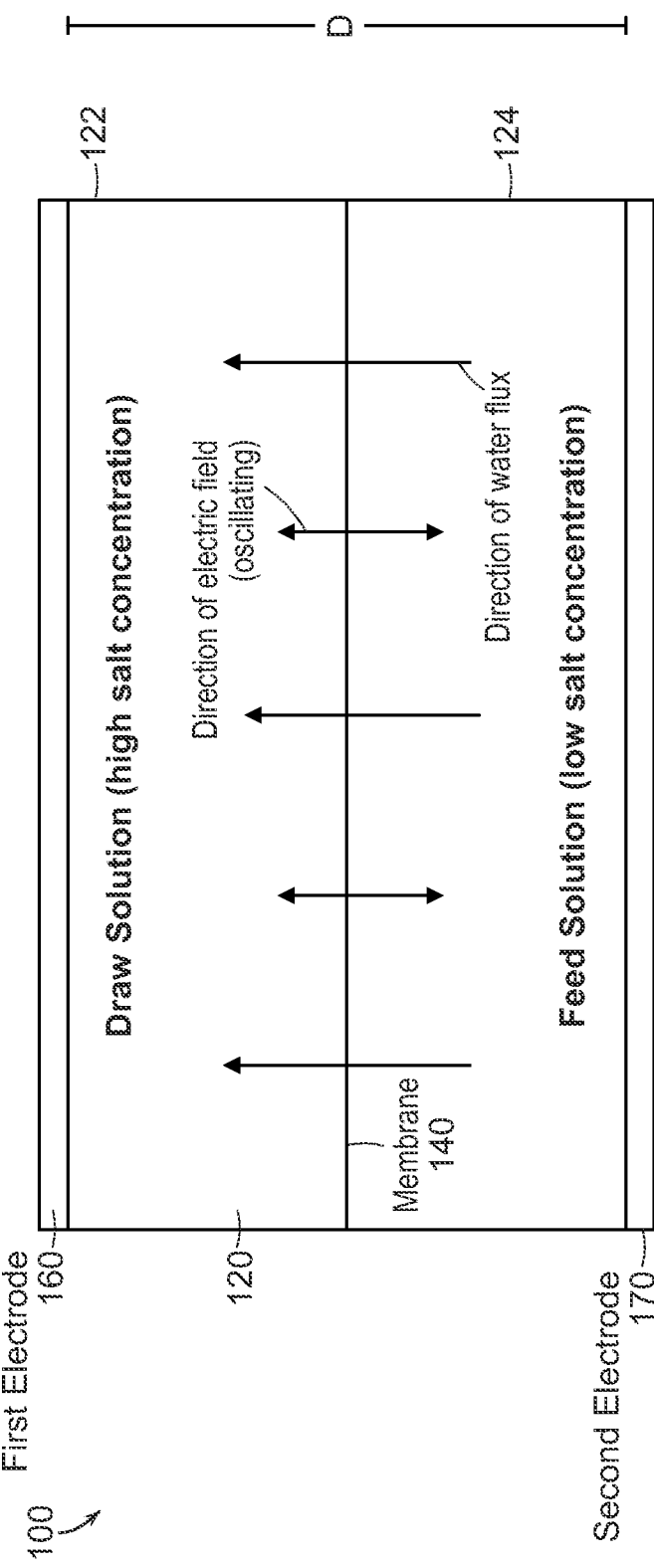
FIG. 1 is a schematic view of a forward osmosis filtration cell according to one embodiment.

Turning now to FIG. 1, a schematic view of a forward osmosis filtration cell 100 is illustrated. The filtration cell 100 includes a fluid passageway 120 with a forward osmosis filtration membrane 140 positioned within the passageway. The filtration membrane 140 divides the fluid passageway 120 into two chambers, a first chamber 122 configured to hold a draw solution, and a second chamber 124 configured to hold a feed solution.

As shown in FIG. 1, in the filtration membrane 140, two solutions are separated by a semi-permeable barrier, the membrane 140. The first solution, positioned in the first chamber 122 is a draw solution which has a high osmotic pressure. The second solution, positioned in the second chamber 124, is a feed solution which has a low osmotic pressure. One of ordinary skill in the art will recognize that osmotic pressure, $\pi$, is driven by concentration by the Morse equation:

$$\pi = iMRT$$

In the above equation, i=Van't Hoff Constant, M=Molar Concentration, R=Universal Gas Constant, and T=Temperature. As water goes through the membrane 140 (from the Feed solution side second chamber 124 up to the Draw solution side first chamber 122), particles and/or contaminants within the Feed solution in the second chamber 124 may stick to membrane surface and block flow channels within the membrane. This blockage of the membrane is known as Fouling.

As shown in FIG. 1, unlike prior forward osmosis filtration systems, the filtration cell 100 also includes a first electrode 160 positioned in the first chamber 122, and a second electrode 170 positioned in the second chamber 124. The first and second electrodes 160, 170 are configured to apply an electric field to the filtration membrane 140 to prevent fouling on the filtration membrane. As set forth in more detail below, the first and second electrodes 160, 170 may be used to apply an electric field substantially perpendicular to the membrane 140 which may act as a force on foulants, causing them to migrate away from the membrane surface. In other words, the electric field may act to keep the foulants in suspension within the fluid, preventing these various materials from blocking/clogging the membrane.

The filtration cell 200 shown in FIG. 1 may operate as a rectangular cross-flow filtration device. The Draw solution in the first chamber 122 (a highly concentrated salt water which may be roughly twice as salty as seawater) and the Feed solution in the second chamber 124 (source of water to be extracted, such as a wastewater) flow parallel to the membrane 140 and first and second electrode 160, 170 surfaces. As shown, the field is applied perpendicularly to the flow of water, in the same direction as the water flux. It should be appreciated that in another embodiment, the forward osmosis filtration cell may alternatively be configured to operate as a dead end filtration device.

In one representative embodiment, the forward osmosis filtration membrane 140 is made of cellulose acetate and/or cellulose triacetate. Cellulosic membranes may be desirable forward osmosis membranes because they are hydrophilic (i.e. good water flux performance and low propensity to fouling), and they also have good mechanical strength. In one embodiment, the cellulosic membrane may also include a reinforcement structure, such as a polyester support mesh. One of ordinary skill in the art would recognize that in other embodiments, the filtration membrane may be made of other materials, including but not limited to, a composite of polyamide-based materials, referred to as Thin Film Composite (TFC) membranes. TFC membranes may be made from a variety of materials, but are commonly composed of polysulfone or polyvinyl chloride.

The first and second electrodes 160, 170 may be made of a variety of materials including but not limited to, graphene, graphite, carbon paper, platinum, and gold. In one embodiment, the electrodes may be graphene based electrodes. In one embodiment, the electrodes may be made of a thin carbon paper material. It is desirable for the electrodes to be made of a non-corrosive material, particularly when used in tandem with saline feed or draw solutions. It may also be optimal for the electrode to be thin, less than 1 millimeter, in order to reduce resistance through the electrode.

In one embodiment, the electrodes are configured to provide a low frequency, low voltage electric field. For example, in one embodiment, a 20 VPP (peak-to-peak voltage) 10 kHz electric field may be used. In another embodiment, the electric field may range from 1 VPP up to the previously mentioned 20 VPP, and frequencies may vary from 100 Hz to 10 kHz. Further expansion of the field is predicted, however laboratory scale tests are still needed to provide evidence for the effectiveness of fields outside the aforementioned voltages and frequencies.

The electrodes may be connected to a power source which is configured to supply a direct or alternating electric field across the filtration membrane. In one embodiment, it may be desirable to use an alternating-current (AC) power source as it may be less likely to damage the filtration membrane and/or degrade the electrodes in comparison to direct current (DC). It is also contemplated that the electrodes may be coupled to a renewable energy source, such as, but not limited to those powered by solar and/or wind sources.

As set forth in more detail below, the electric field created by the two electrodes may be continuous or pulsed. A pulsed electric field is defined as an electric field which is applied intermittently over the filtration time period. In other words, there may be a time period where the electrodes apply an electric field, followed by a time period where there is no electric field across the membrane.

In one experimental embodiment, a 1 molar sodium chloride solution is used as the Draw Solution in the first chamber 122, and 1 g/L bovine serum albumin is used as the Feed Solution in the second chamber 124. Bovine serum albumin (BSA) is a protein used as a model foulant for biofouling and organic fouling. The forward osmosis filtration membrane 140 is made of cellulose triacetate with a polyester support mesh. Flux across the membrane 140 (i.e. rate of permeation) is calculated from mass gain in draw solution in the following equation:

$$J = \frac{V}{Area * Time}$$

It should be appreciated that flux as percentage of the initial flux can be used to determine losses due to fouling of the membrane 140. In this laboratory experiment, the draw solution and the feed solutions each travel from their respective tanks, into the filtration cell where filtration occurs, and are then recycled back into their respective tanks. An electric field is generated using a function generator and is monitored with an oscilloscope. Mass readings of the draw solution are taken every 10 seconds.

Figure 2:
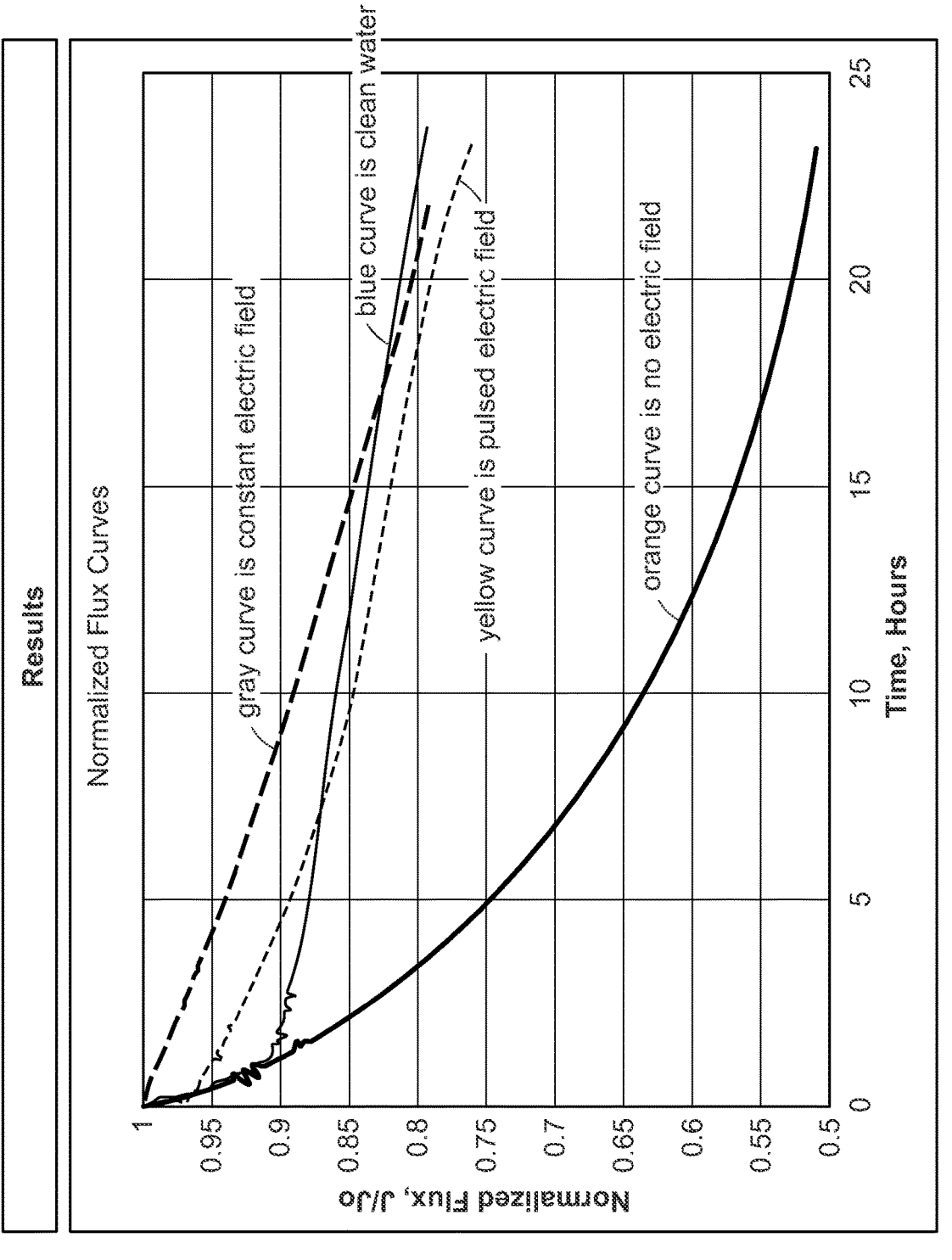
FIG. 2 is representative data shown in a graph illustrating normalized flux curves for one embodiment.

FIG. 2 illustrates one set of experimental results. In particular, this graph illustrates a plurality of normalized flux curves for four different sets of test conditions. Normalized flux ($J_n$) is used to represent flux (J) at a given time point in the trial, as a ratio to initial flux ($J_0$).

$$J_n = \frac{J}{J_o}$$

First, the clean water flux curve denotes clean water flux across the membrane over the course of 24 hours. As shown, after about one day, the clean water flux is reduced to about 80% of the initial flux. In contrast, the bottom curve denotes the normalized flux based upon the above bovine serum albumin test conditions with no application of an electric field across the membrane. As shown, the flux is greatly reduced across the membrane, such that it is reduced to approximately 50% after 24 hours.

The graph shown in FIG. 2 also includes normalized flux curves for the same bovine serum albumin sample under both a constant electric field across the membrane and a pulsed electric field. As shown, in this experiment, after over 20 hours, the normalized flux with both a constant electric field and a pulsed electric field is similar to clean water conditions. In this experiment, the pulsed electric field was applied for approximately two minutes every two hours. After two minutes, the electric field was turned off for about two hours.

Based upon this experiment, one can conclude that clean water flux can be reduced by 10-20% due to dilution. The experiment also shows that with no electric field, the reduction in flux can be approximately 50% of the initial flux value. This is caused by fouling on the membrane. The experiment also demonstrates that the application of an electric field in the presence of foulants may result in a smaller loss of flux, thus supporting the finding that an application of an electric field across the membrane of a forward osmosis filtration membrane can reduce losses in flux due to membrane fouling.

Figure 3:
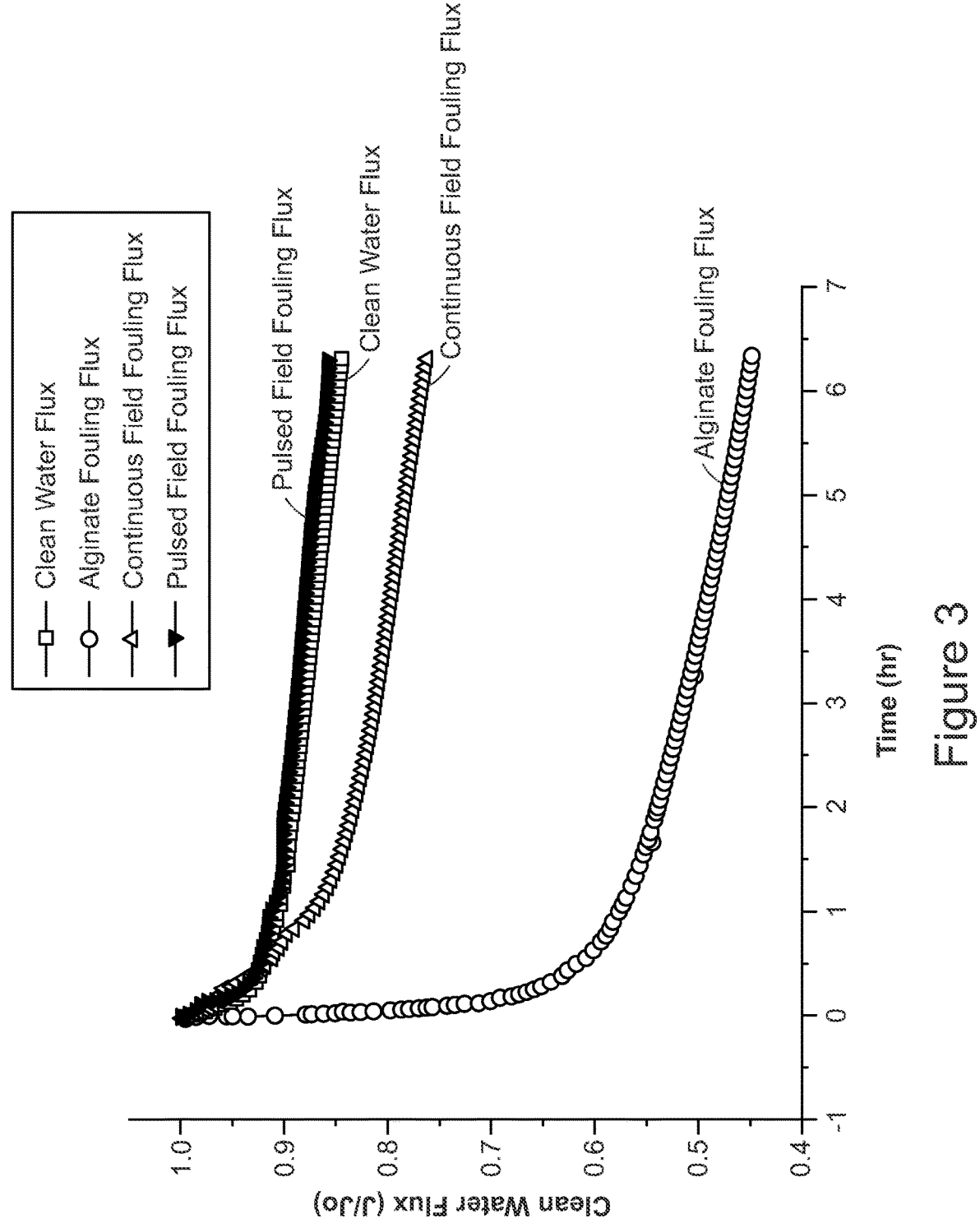
FIG. 3 is representative data shown in another graph illustrating clean water flux as a function of time.

FIG. 3 illustrates additional experimental data of normalized flux which supports this conclusion. In particular, FIG. 3 is a graph that shows the clean water flux as a function of time for four samples. The first curve is a baseline that shows the flux curve for a clean water sample. The bottom curve shows the flux curve for an alginate sample without any electric field. As shown, the flux drops from 1.0 to less than 0.5 after five hours. The graph in FIG. 3 also includes flux curves for the same alginate sample under both a continuous electric field across the membrane and a pulsed electric field. As shown, in this experiment, after over six hours, the flux with both a constant electric field and a pulsed electric field is similar to clean water conditions. Notably, the pulsed electric field provided improved results over the continuous electric field. In this experiment, the pulsed electric field was applied for approximately two minutes every two hours. After two minutes, the electric field was turned off for two hours.

Figure 4:
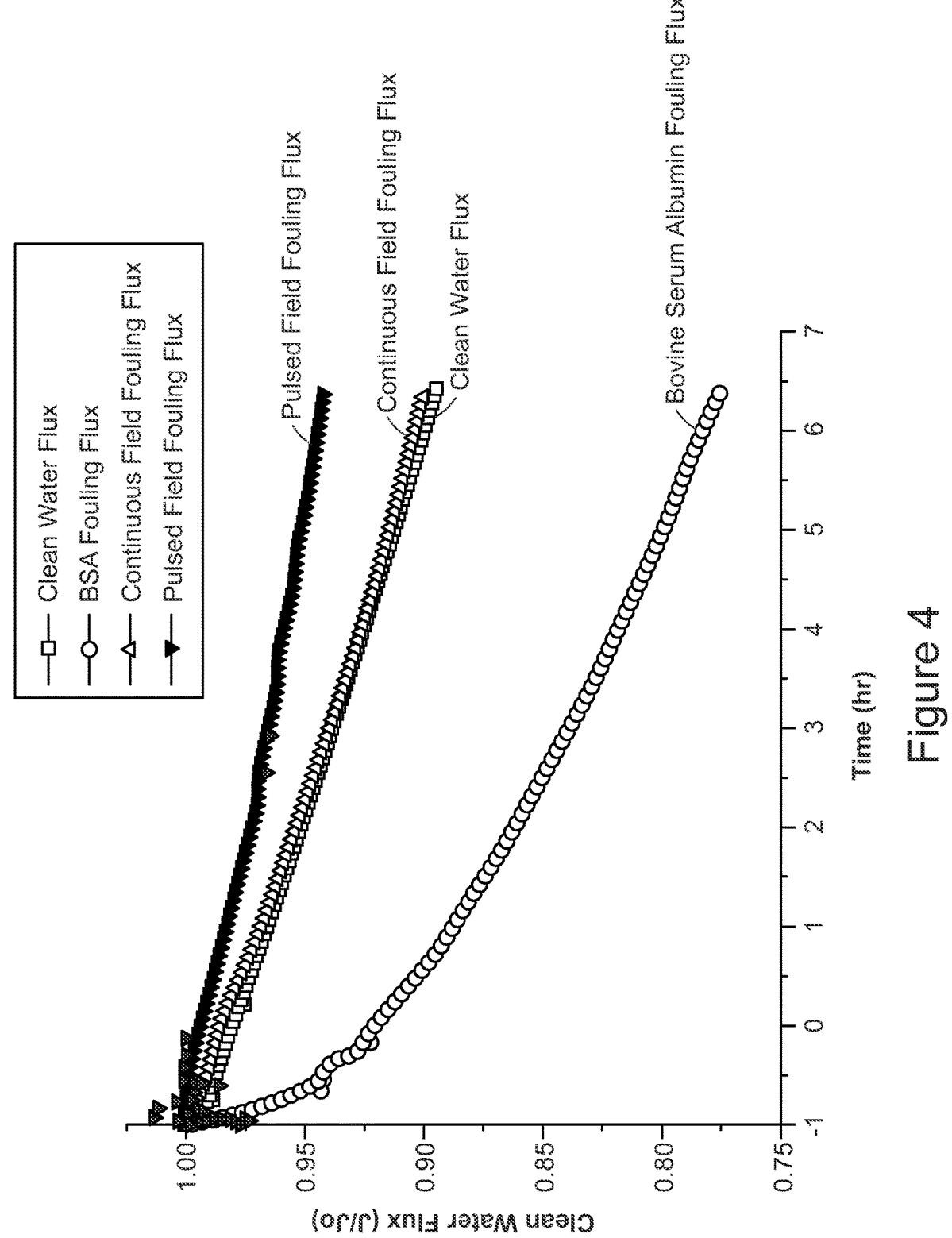
FIG. 4 is representative data shown in another graph illustrating clean water flux as a function of time.

FIG. 4 is another graph that shows the clean water flux as a function of time for four samples. The first curve shows the flux curve for a clean water sample. The bottom curve shows the flux curve for a bovine serum albumin sample without any electric field. As shown, the normalized flux drops from 1.0 to less than 0.8 after seven hours. The graph in FIG. 4 also includes flux curves for the same bovine serum albumin sample under both a continuous electric field across the membrane and a pulsed electric field. As shown, in this experiment, after over seven hours, the flux with both a constant electric field and a pulsed electric field is similar to clean water conditions. Notably, the pulsed electric field provided improved results over the continuous electric field. In this experiment, like the above-described experiments, the pulsed electric field was applied for approximately two minutes every two hours. After two minutes, the electric field was turned off for about two hours.

Figure 5:
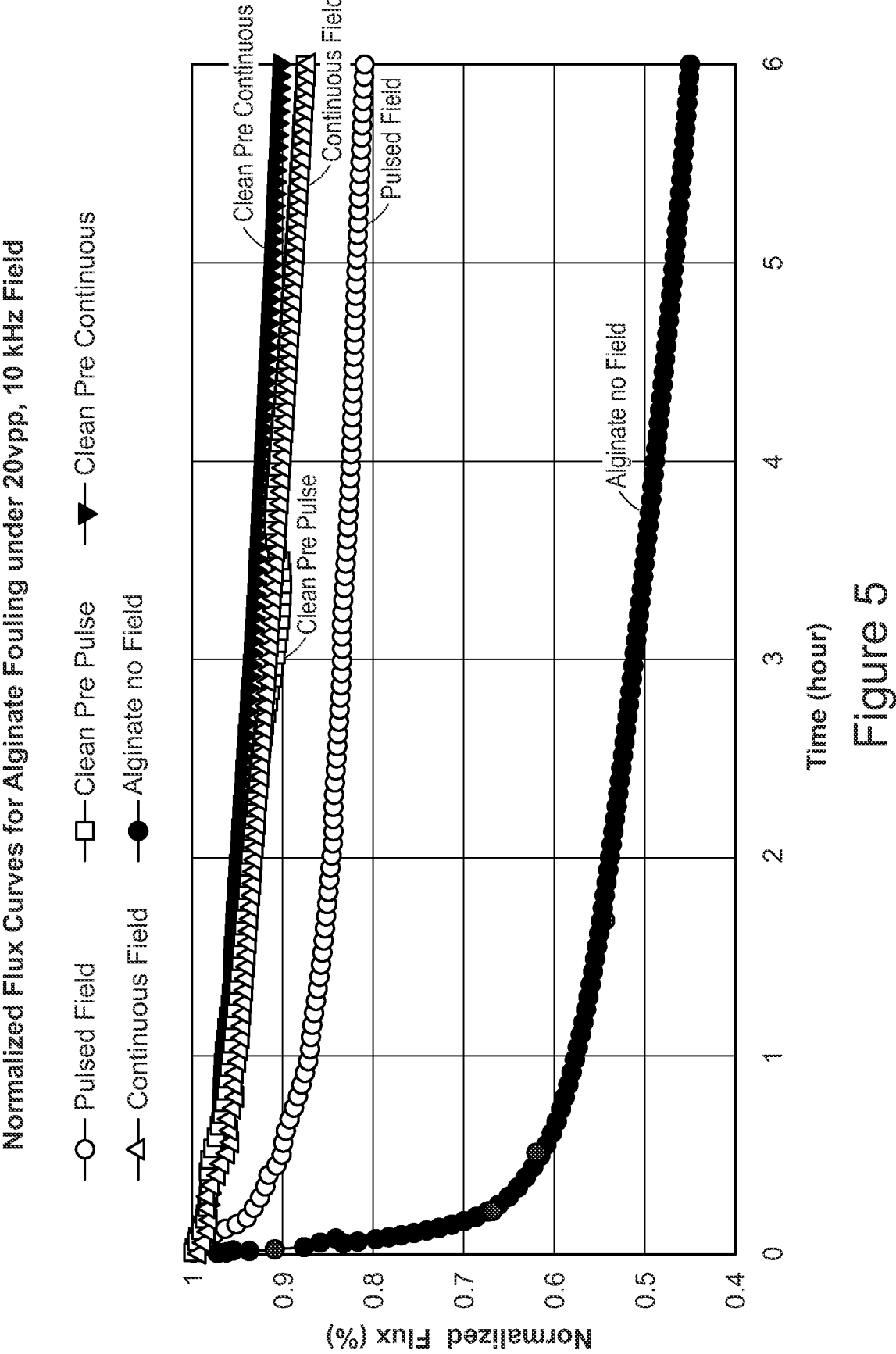
FIG. 5 is representative data shown in another graph illustrating normalized flux curves for one embodiment.

FIG. 5 illustrates normalized flux curves for an alginate sample using a 10 kHz electric field generated from a function generator under 20 VPP. The bottom curve shows the normalized flux curve for an alginate sample with no electric field. The graph in FIG. 5 also includes flux curves for the same alginate sample under both a continuous electric field across the membrane and a pulsed electric field. In this experiment, before the alginate sample is filtered using this filtration cell with an electric field, clean water is run through the filtration cell. This is represented by the two additional flux curves, labeled "Clean Pre Continuous" which is the flux curve from clean water being filtered through the filtration cell before the application of a continuous electric field on the alginate sample, and "Clean Pre Pulsed" which is the flux curve from clean water being filtered through the filtration cell before the application of a pulsed electrode field on the alginate sample.

Figures 6, 7:
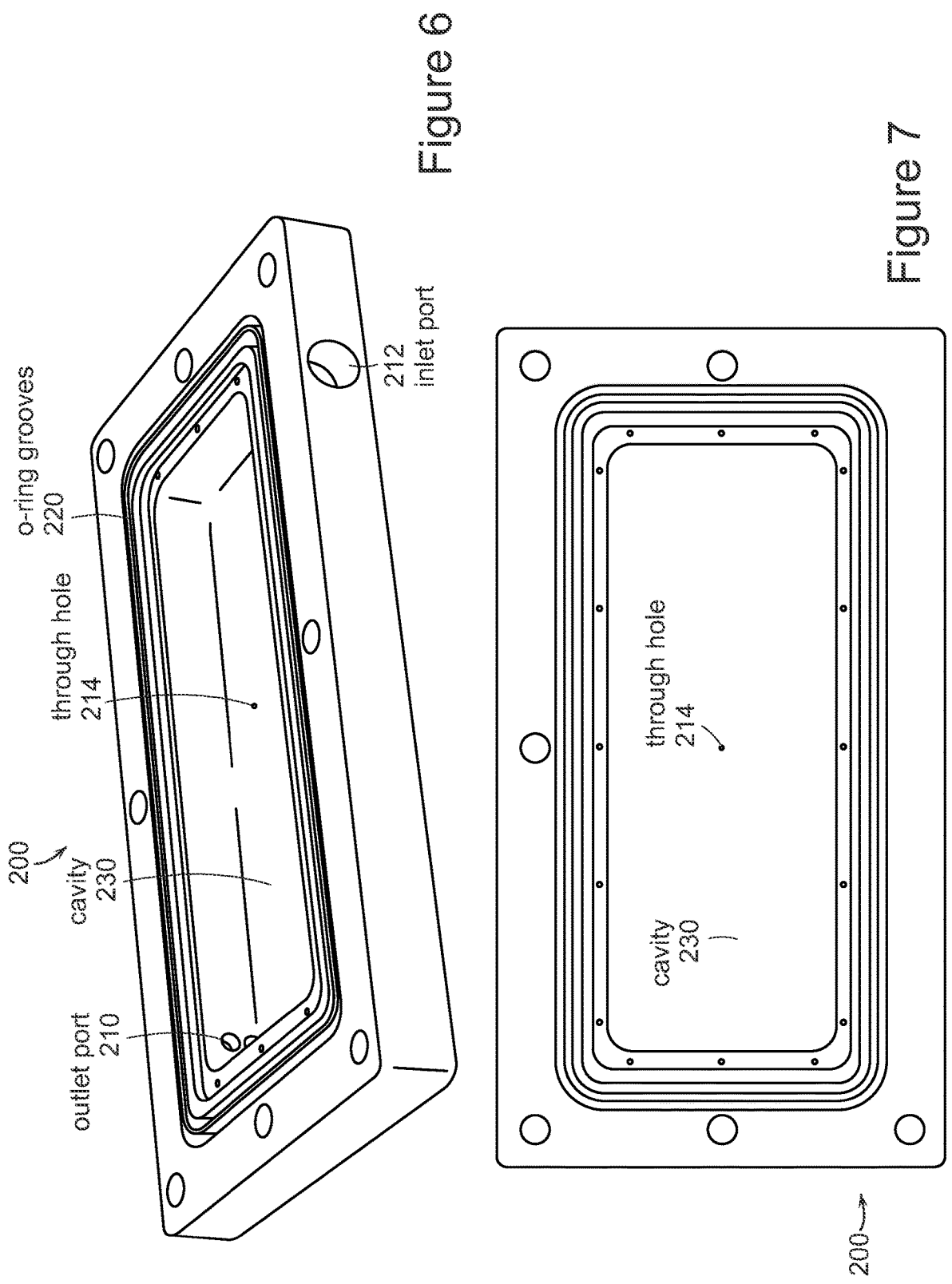
FIG. 6 is a perspective view of a first portion of a filtration cell according to one embodiment.
FIG. 7 is a top view of the first portion of the filtration cell shown in FIG. 6.

Turning now to FIGS. 6 and 7, one embodiment of a forward osmosis filtration cell is illustrated. The plate 200 shown in FIGS. 6 and 7 may form a portion of the filtration cell. The plate 200 has a concavity 230 which forms a chamber 122. A second plate may be substantially identical to the first plate having a cavity forming a chamber 124. The two plates may be stacked together with a forward osmosis filtration membrane positioned between the plates such that the concavity 230 in the first plate forms the first chamber 122 of the filtration cell and the concavity 230 in the second plate forms the second chamber 124 of the filtration cell. As shown, the plates 200 may each have an inlet port 212 and an outlet port 210 so that the fluid can flow into and out of the two chambers 122, 124 and substantially parallel to the filtration membrane nested between. The plates 200 may include one or more sealing elements and may include, for example, one or more O-ring grooves 220 for sealing the first and second chambers when the two plates are stacked together. Furthermore, the plates 200 may include one or more holes around the perimeter for the placement of bolt and/or screws to secure the plates together.

As discussed above, the filtration cell includes first and second electrodes. The first electrode (not shown) may be positioned across the bottom surface of the cavity 230 in the first plate. The second electrode (not shown) may be positioned across the bottom surface of the cavity in the other plate. As also mentioned above, it may be advantageous for the first electrode and the second electrode to extend substantially parallel to the filtration membrane. An opening, such as through hole 214, may be provided in the cavity 230 so that a wire can extend through the plate to couple the electrodes to a power source, such as a function generator. The first and second electrodes may be made of a carbon paper material and the electrodes may be glued or otherwise secured to the bottom surface of the cavities 230.

It is contemplated that the distance "D" (see FIG. 1) between the first and second electrodes 160, 170 may be determined to provide the desired electric field properties across the membrane. In one embodiment, the distance D may be between 0.5 cm and 5 cm. In another embodiment, it is contemplated that the distance D may between 0.5 cm and 10 cm. It is also contemplated that the filtration cell may be configured so that the distance D between the first and second electrodes is adjustable. For example, one or more additional plates may be stacked in between the first and second electrodes to increase the distance D between electrodes. Furthermore, a plate having a deeper and/or shallower cavity 230 may also be used to vary the distance D.

The plates 200 may be made of a variety of non-conductive materials, including plastic. In one embodiment, each plate 200 is made of DELRIN® crystalline plastic and each rectangular plate may measure approximately 10 inches×5 inches×1 inches, with each having a cavity 230 which is about 0.4 cm in depth.

Figure 8:
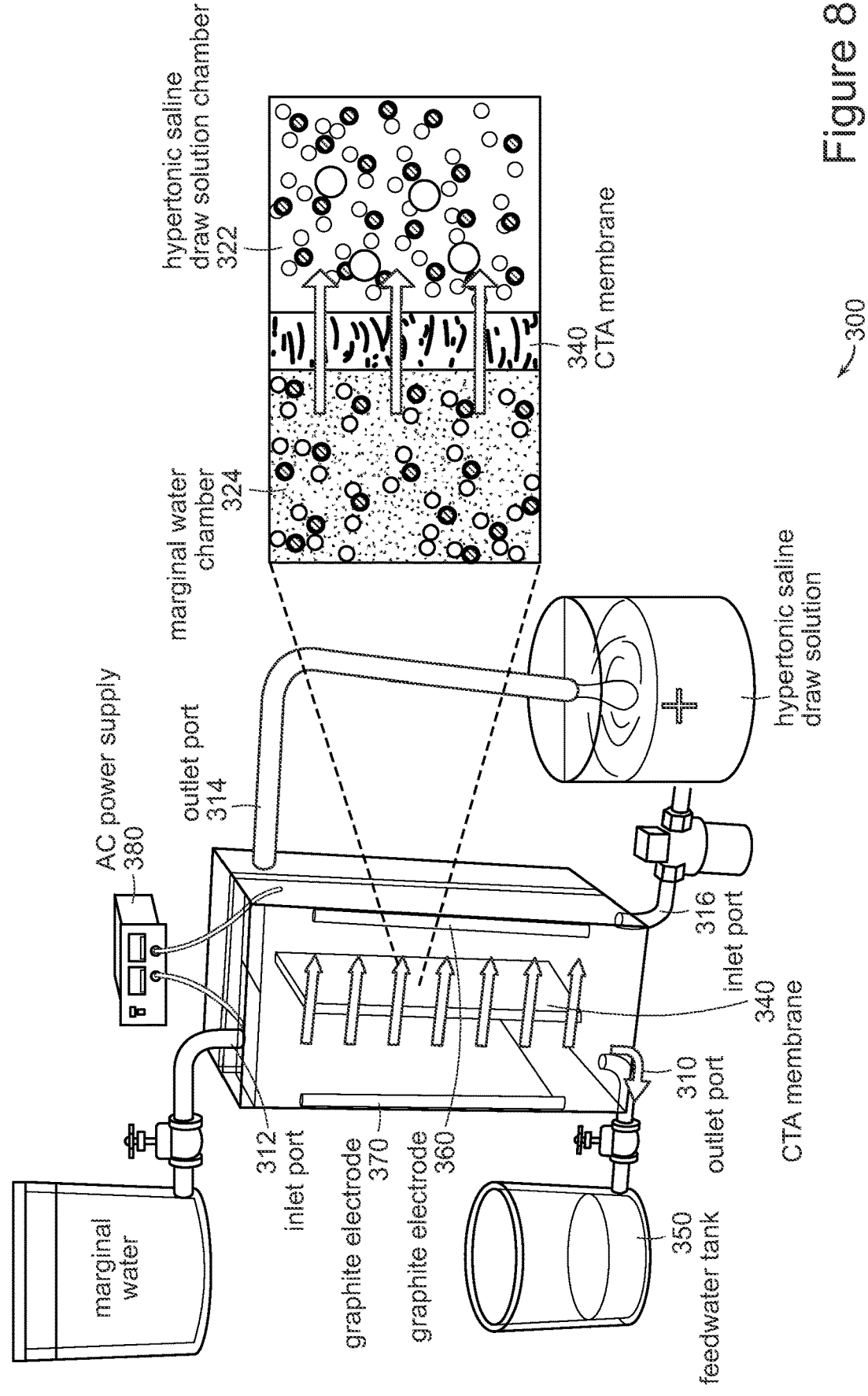
FIG. 8 is a schematic view of an electric field assisted forward osmosis device according to one embodiment.

FIG. 8 illustrates another embodiment of a forward osmosis filtration cell, which may also be referenced as an electric assisted forward osmosis (EFO) device 300. This is a custom designed EFO device 300 that was made to demonstrate the efficacy of the presence of continuous and pulsed electric field in controlling forward osmosis membrane fouling and water recovery from test marginal water. As shown in FIG. 8, the device 300 (which may be portable) includes a cellulose triacetate (CTA) membrane 340 sandwiched between marginal water and hypertonic saline draw solution chambers 324, 322. Graphite electrodes 360, 370 are fixed on the topside side of marginal water and draw solution chambers 324, 322, and are connected to external AC power supply 380. As shown, both marginal water and the draw solution chambers 324, 322 are configured with inlet and outlet ports 310, 312, 314, 316. Marginal water enters through inlet port 312 and a feedwater tank 350 is provided at outlet port 310. The AC power supply 380 delivers a predetermined electric field strength and frequency as well as on-demand continuous versus pulsed fields across the membrane 340. The hypertonic saline draw solution is recycled until the volume of source water is reduced to 90% of initial volume. The device 300 extracts ultrapure water from the marginal water into hypertonic saline draw solution through an osmotic gradient and in the presence of continuous- and pulsed-electric fields across the CTA membrane 340. The feasibilities studies were conducted using model organic foulants (e.g., bovine serum albumin (BSA) and sodium alginate (Alg)) and calcium chloride as the background electrolyte.

One of the primary goals of producing the EFO device 300 shown in FIG. 8 is to produce United States Pharmacopeia (USP) grade saline (0.15 M) from diverse marginal quality water sources (e.g., grey water and wastewaters) unimpeded by the FO membrane foulants and concentration polarization. In one embodiment, this portable device 300 (i.e. generator) (1) uses 90% less energy compared to conventional reverse osmosis, (2) requires very low pressure (<5 psi) to drive fluid flow, (3) applies low-power electric field across the membrane to prevent foulants from blocking the membrane water channels, (4) applies low-power electric field across the membrane to mitigate the impact of concentration polarization on osmotic gradient, (5) couples electric fields and FO membrane water channels to maintain continuous production of saline for prolonged periods of operation, and (6) can supply low-power electric fields via solar-powered photovoltaic panel or solar battery.

FIG. 8 illustrates the experimental set up used for proof-of-concept studies with commonly used model organic foulants including: (i) 1 g/L BSA and (ii) 200 mg/L alginate, with and without 5 mM calcium chloride as background electrolyte. A series of preliminary studies show a promise for tuning the electric field parameters (frequency and field strength) and the mode (continuous vs pulsed) for controlling fouling and water flux during osmotic process. Results can be summarized as follows: (i) both continuous and pulsed fields significantly mitigated alginate and BSA fouling, (ii) both continuous and pulsed fields remarkably recovered osmotic flux relative to fouling conditions, (iii) electric field frequency and mode as well as foulant type affected the percent flux recovered, (iv) at 1 kHz, the pulsed field showed dramatic flux recovery (~100% or greater), and (v) at 100 Hz and 10 kHz, the continuous field performed better than the pulsed in terms of recovering flux relative to no fouling and no field conditions. These results demonstrate that overall electric field parameters can be tuned to mitigate BSA and alginate fouling and generate high flux for the duration of operational period. In addition, the electric frequency and mode can be tuned to affect different types of foulants in the presence of divalent cations such as calcium ions.

One goal was to demonstrate the ability to tune the AC electric field parameters (frequency and intensity) and the mode (continuous vs pulsed) for controlling precisely the membrane fouling and thereby water flux in commercial cellulose triacetate membranes. In one embodiment, the system shown in FIG. 8 was used to carry out the tests under varying frequency and mode as well as foulant types. The initial value of AC field strength (8 V/cm), foulant concentration, calcium ion concentration, and temperature were remained constant. The frequency of the AC field was varied (100 Hz to 10 kHz) to study its influence on fouling and water flux. 5 mM calcium chloride was used to accelerate membrane fouling via $Ca^{2+}$ ion bridging between foulant-foulant and foulant and membrane surface moieties.

The above described FIGS. 2-3 demonstrate that (1) extent of CTA membrane fouling depends on foulant type (e.g., alginate vs BSA), (2) electric field mode (continuous vs pulsed) at constant frequency (1 kHz) affects various foulants differently, (3) pulsed field performs similar to or better than continuous fields at 1 kHz, and (4) electric fields (both continuous and pulsed) minimize flux loss due to membrane fouling and concentration polarization.

The graphs shown in FIGS. 2-5 demonstrate the effect of frequency on alginate fouling under continuous and pulsed electric field. In one embodiment, the electric field strength was maintained constant at 8 V/cm and frequency was varied between 100 Hz and 10 kHz. The results are summarized as follows: (1) at both 100 Hz and 10 kHz, continuous field resulted in better flux recovery than pulsed field, (2) 90-95% of initial flux (no field and no alginate) was recovered under continuous field at both 100 and 10 kHz, (3) on the contrary, at 1 kHz the flux recovery was greater than 100% of initial flux value (no field and no alginate). Overall, the results suggest that electric field parameters and mode based on foulant type (source water chemistry) can be tuned to harness high water flux and mitigate FO membrane fouling and concentration polarization.

This disclosure also contemplates methods of using a forward osmosis filtration cell to filter water in a water treatment system. The method may include providing a forward osmosis filtration membrane in a fluid passageway, the filtration membrane dividing the fluid passageway into a first chamber and a second chamber, flowing a draw solution into the first chamber, and flowing a feed solution into the second chamber. The method further includes generating an electric field across the filtration membrane with a first electrode positioned in the first chamber and a second electrode positioned in the second chamber to prevent fouling on the membrane.

In one embodiment, the method may include pulsing the electric field across the filtration membrane with the first and second electrodes to intermittently generate the electric field across the filtration membrane. The pulsing electric field may include generating the electric field across the filtration membrane for at least two minutes before turning off the electric field. The method may include thereafter turning off the electric field for at least two hours. This pulsing of the electric field across the filtration membrane may be repeated throughout the filtration time. Pulsing may be desirable as it may minimize the amount of energy required to selectively generate an electric field to reduce fouling on the membrane while still providing similar effects in comparison to a continuous electric field.

The disclosure also contemplates methods of retrofitting a water treatment system to filter water, where the water treatment system has a forward osmosis filtration membrane in a fluid passageway, the filtration membrane dividing the fluid passageway into a first chamber and a second chamber. The method includes placing a first electrode in the first chamber, placing a second electrode in the second chamber, and generating an electric field across the filtration membrane with a first electrode positioned in the first chamber and a second electrode positioned in the second chamber to prevent fouling on the membrane.

It is contemplated that the above described filtration cell and methods may be utilized to provide clean water from at least one of a local body of water, mine drainage, surface water runoff, produced water, hospital wastewater and/or animal waste. It is contemplated that the filtration cell and filtration methods may be incorporated into water treatment systems that have various applications, including, but not limited to medical applications, military applications, and/or agricultural applications.

In one embodiment, the water treatment system is configured to dilute a solution to a desired concentration. For example, in a medical application, such as when a large volume of medical solutions must be transported a long distance, a highly concentrated solution could be transferred and the above-described filtration cell could be used to filter water from, for example, a local body of water. This filtered water could then be used to dilute the concentrated medical solution to the desired concentration. In an agricultural setting, the above-described forward osmosis filtration cell could be used to extract clean water from, for example, animal waste and/or water runoff. The resulting clean water could be used to dilute pesticides used, for example, on a crop field. It is also contemplated that the above-described filtration cell could have various military applications as well, as there may be a need to produce clean sterile pure water for on-site use in combat zones and/or in underdeveloped areas.

In one embodiment, the forward osmosis filtration cell may be a custom-designed filtration cell that can be retrofitted into an existing water treatment system. In one embodiment, the filtration cell may be configured to be portable and it may be configured to be easily removed from the system as desired. This filtration cell may include the above described filtration membrane and electrodes and it may be retrofitted to existing waste water systems. Furthermore, it is also contemplated that the electrodes can be retrofitted into an existing water treatment system without having to alter/change the existing filtration membrane.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A forward osmosis filtration cell comprising:
a first plate having a concavity forming a first chamber configured to hold a draw solution, the first plate having an inlet port and an outlet port for the first chamber;
a second plate having a concavity forming a second chamber configured to hold a feed solution, the second plate having an inlet port and an outlet port for the second chamber, wherein the second plate is stacked with the first plate;
a forward osmosis filtration membrane positioned between the first and second plates, the filtration membrane dividing the first chamber from the second chamber;
a first electrode positioned in the first chamber;
a second electrode positioned in the second chamber, and
wherein the first electrode and the second electrode are both spaced apart from the filtration membrane and configured to apply an electric field across the filtration membrane to prevent fouling on the filtration membrane.

2. The forward osmosis filtration cell of claim 1, further comprising an alternating-current (AC) power source configured to apply the electric field across the filtration membrane.

3. The forward osmosis filtration cell of claim 1, wherein the first and second electrodes are configured to apply a continuous electric field across the filtration membrane to prevent fouling on the filtration membrane.

4. The forward osmosis filtration cell of claim 1, wherein the first and second electrodes are configured to apply a pulsed electric field across the filtration membrane to prevent fouling on the filtration membrane.

5. The forward osmosis filtration cell of claim 1, wherein the first electrode extends substantially parallel to the filtration membrane, and wherein the second electrode extends substantially parallel to the filtration membrane.

6. The forward osmosis filtration cell of claim 1, wherein the first and the second electrodes are made from carbon paper.

7. The forward osmosis filtration cell of claim 1, wherein the first electrode is positioned across a bottom surface of the cavity in the first plate, and wherein the first plate includes an opening in the cavity for a wire to couple the first electrode to a power source.

8. The forward osmosis filtration cell of claim 7, wherein the second electrode is positioned across a surface of the cavity in the second plate, and wherein the second plate includes an opening in the cavity for a wire to couple the second electrode to a power source.

9. The forward osmosis filtration cell of claim 8, wherein the first electrode is made from a carbon paper material glued to the bottom surface of the first chamber, and the second electrode is made from a carbon paper material glued to the bottom surface of the second chamber.

10. The forward osmosis filtration cell of claim 1, wherein the second plate is substantially identical to the first plate.

11. A method of using a forward osmosis filtration cell to filter water in a water treatment system, the method comprising:

providing a forward osmosis filtration cell comprising:

a first plate having a concavity forming a first chamber configured to hold a draw solution, the first plate having an inlet port and an outlet port for the first chamber;

a second plate having a concavity forming a second chamber configured to hold a feed solution, the second plate having an inlet port and an outlet port for the second chamber, wherein the second plate is stacked with the first plate;

a forward osmosis filtration membrane positioned between the first and second plates, the filtration membrane dividing the first chamber from the second chamber;

a first electrode positioned in the first chamber;

a second electrode positioned in the second chamber, and wherein the first electrode and the second electrode are both spaced apart from the filtration membrane and configured to apply an electric field across the filtration membrane to prevent fouling on the filtration membrane;

flowing a draw solution into the first chamber;

flowing a feed solution into the second chamber; and generating an electric field across the filtration membrane with a first electrode positioned in the first chamber and a second electrode positioned in the second chamber to prevent fouling on the membrane.

12. The method of claim 11, wherein the generating an electric field across the filtration membrane included pulsing the electric field across the filtration membrane with the first electrode and the second electrode to intermittently generate the electric field across the filtration membrane.

13. The method of claim 12, wherein the pulsing the electric field across the filtration membrane includes generating the electric field across the filtration membrane for at least two minutes before turning off the electric field.

* * * * *